United States Patent [19]

Kronstein et al.

[11] 4,305,853

[45] Dec. 15, 1981

[54] CHEMICAL MODIFICATION OF METAL OXIDES AND LECITHIN MATERIALS

[75] Inventors: Max Kronstein, Bronx, N.Y.; Joseph Eichberg, Atlanta, Ga.

[73] Assignee: American Lecithin Company, Atlanta, Ga.

[21] Appl. No.: 129,474

[22] Filed: Mar. 11, 1980

[51] Int. Cl.$^3$ .................................................. C08K 9/04
[52] U.S. Cl. ............................. 260/22 A; 106/288 Q; 106/296; 106/297; 106/300; 106/301; 106/304; 106/308 F; 260/403
[58] Field of Search .......................... 260/403, 22 A; 106/288 Q, 308 Q, 296, 297, 300, 301, 302, 304, 308 F

[56] References Cited

U.S. PATENT DOCUMENTS

| | | | |
|---|---|---|---|
| 2,997,398 | 8/1961 | Kronstein et al. | 106/14.36 |
| 3,068,111 | 12/1962 | Seymour | 260/403 |
| 4,056,494 | 11/1977 | Kronstein et al. | 260/22 A |
| 4,126,591 | 11/1978 | Kronstein et al. | 260/22 A |

OTHER PUBLICATIONS

"Organic Coatings and Plastics Chemistry", vol. 41, Preprints of Papers presented by the Division of Organic Coatings and Plastics Chemistry at the American Chemical Society, 178th National Meeting, Washington, D.C., Sep. 9-14, 1979, Surface Modification of Metal Oxide Pigments by Combination with Lecithin Materials, pp. 514–517.

*Primary Examiner*—Paul R. Michl
*Attorney, Agent, or Firm*—Fisher, Christen & Sabol

[57] ABSTRACT

A process of chemically modifying metal oxides, that is oxides of metals such as iron, lead, molybdenum, titanium, zinc and other metals, by treating them under heating at a temperature between 100° and 160° C. for a time period between 10 minutes and one hour or more with a lecithin material, in fluid form (including molten form). The lecithin material is a vegetable lecithin, an animal lecithin or the acetone-soluble fraction of either type of lecithin. Such metal oxide groupings enter the lecithin-fluid fraction. Whereafter a modified metal oxide, partially in a suspended form, is developed partially dissolved in the fluid lecithin (where such product can be utilized as a modified form of the fluid lecithin fraction). Such solid modified metal oxide thereafter can be sedimented from the modified oily fraction. Such modified metal oxides, instead of their initial form, can be used in such form. Or, the modified metal oxides can be placed into a water dispersion, whereafter the dissolved matter can in solution further interreact with reactive components dissolved in the same water, or can interreact with an additional reactive organic component (such as an unsaturated polymeric matter, in particular a latex), whereby such metal oxide matter with the lecithin-groupings enters into the water dispersion. The lecithin modified metal oxides can be used as paint pigments which are readily redispersible within the paint after storage (with or without addition of additional lecithin matter).

33 Claims, 14 Drawing Figures

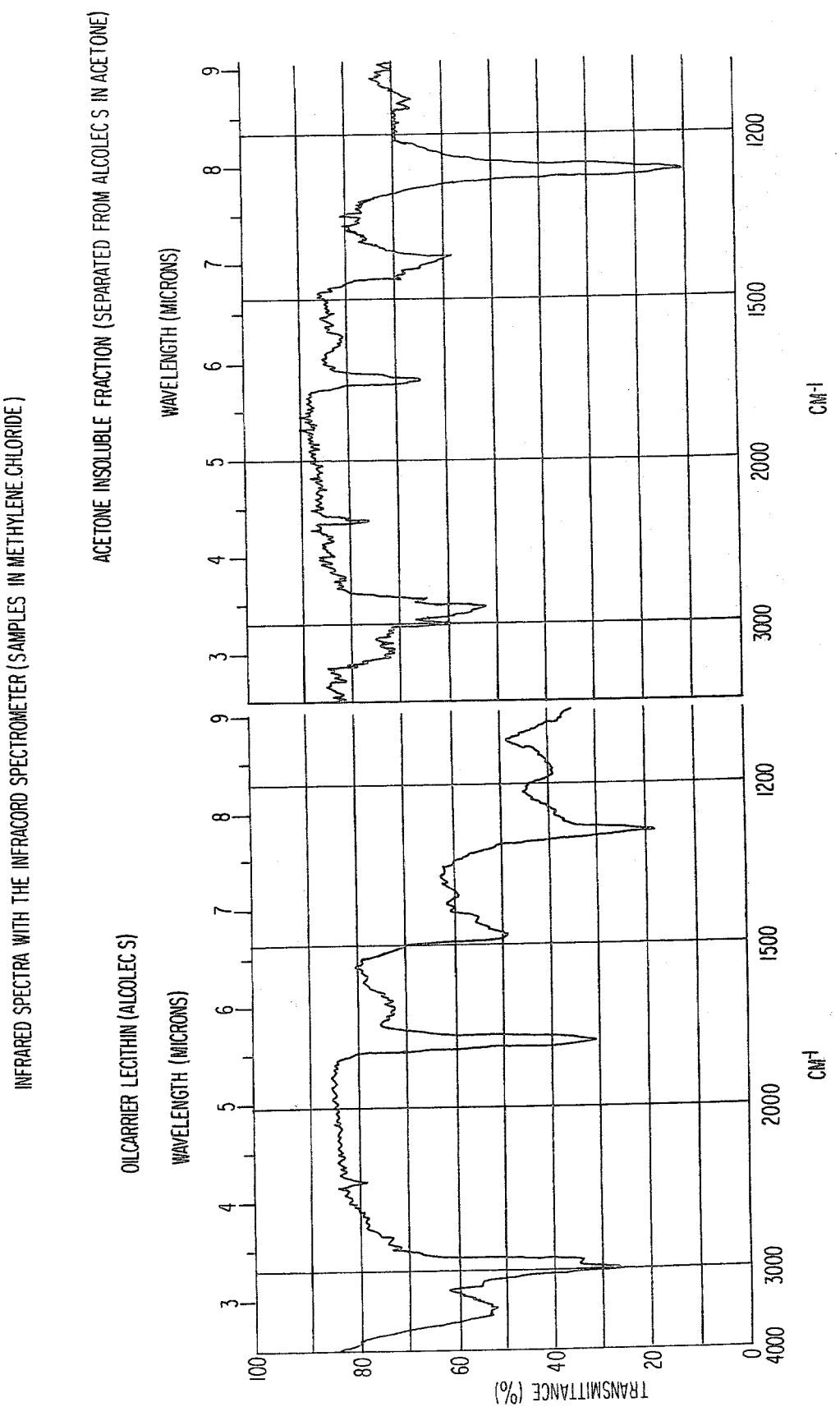

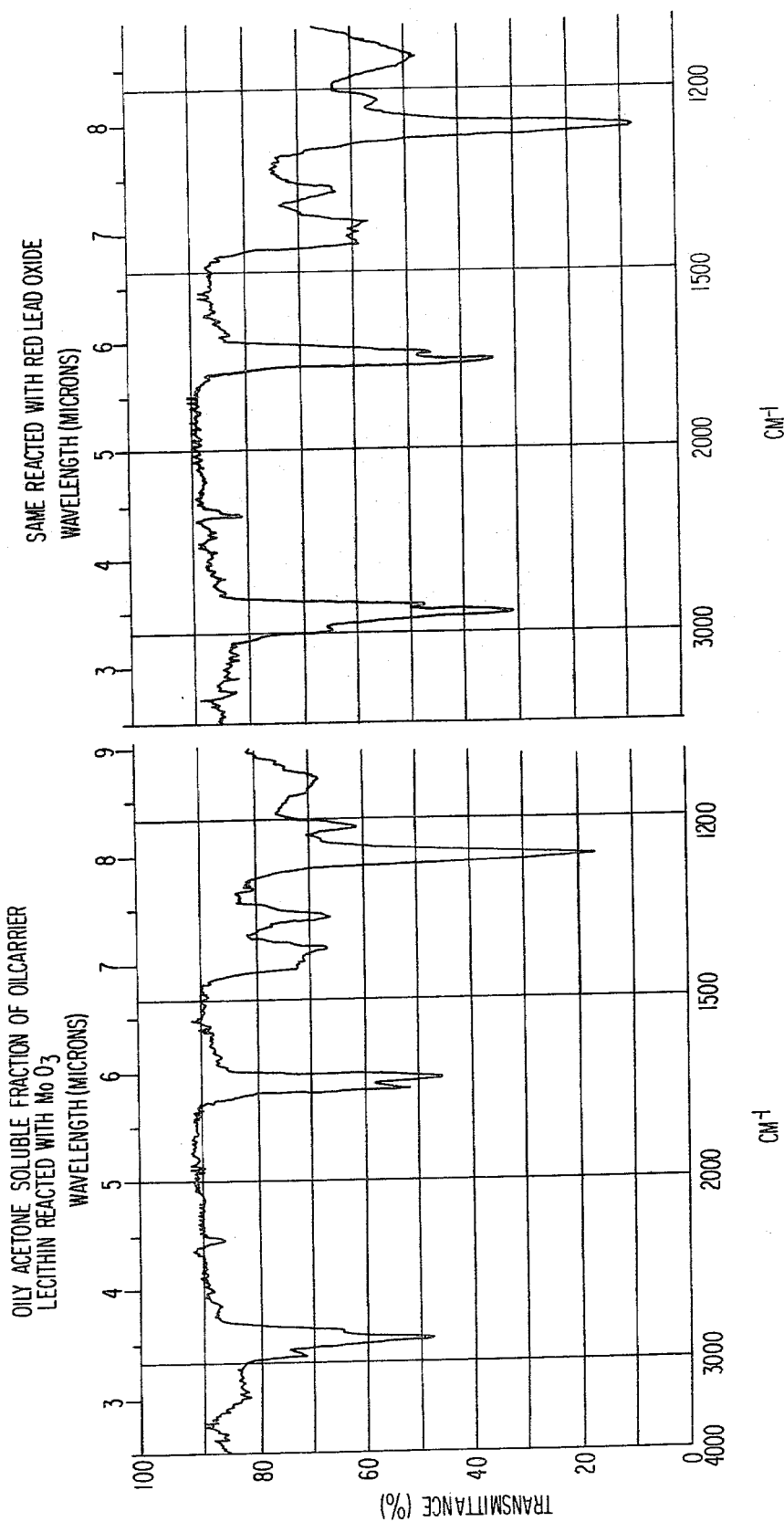

2

CHEMICAL MODIFICATION OF METAL OXIDES AND LECITHIN MATERIALS

BACKGROUND OF THIS INVENTION

1. Field Of This Invention

This invention relates to the field of the use of metal oxides in paints and the like.

2. Prior Art

Metal oxides are widely used as color-carrying and hiding-power-supplying pigmentations in organic coating materials (solvent-based and water-based coating materials). In such applications they are expected to represent stable and not further reacting "filler" substances in the coatings and to supply lasting properties to the applied coatings.

U.S. Pat. Nos. 4,056,494 and 4,126,591 (Kronstein and Eichberg) show that paint compositions which are based on a fluid vehicle and dispersed paint pigment components will remain more fully dispersed or are more easily redispersed into their initial state and color when lecithin matter is added to the composition or when the surface of the pigment particles has first been brought in contact with lecithin matter for the subsequent dispersion.

In U.S. Pat. No. 2,997,398 a soybean lecithin or a zinc lecithinate was used only in small amounts as an additive to a mixture of 65 parts red lead and 22 parts linseed oil, limiting such additive to 5 parts with such mixtures which was further diluted also with 19 parts volatile solvent. No attempt was made to recover the red lead pigment itself and to obtain a modified lead oxide for further utilization or to obtain a reaction with red lead. In the U.S. Pat. No. 2,997,398, lecithin materials were introduced into metal derivatives—but the disclosure is limited to the formation of metal lecithinates and of phosphorylated lecithin by reacting the lecithin with such metal derivatives as metal hydroxides, acetates, carbonates, chromates, naphthenates and phosphates of the metals whose compounds were to be formed.

BROAD DESCRIPTION OF THIS INVENTION

An object of this invention is to provide a process for preparing lecithin-modified metal oxides that are readily redispersible in paints. Other objects and advantages of this invention are set out herein or are obvious herefrom.

The objects and advantages of this invention are achieved by the process of this invention.

This invention involves a process of chemically modifying metal oxides, that is, oxides of metals such as iron, lead, molybdenum, titanium, zinc and other metals, by treating them under heating at a temperature between 100° and 160° C. for a time period between 10 minutes and one hour or beyond with a lecithin material. The lecithin material should be used in a fluid (liquid) form (including molten form). The lecithin material is a vegetable lecithin, an animal lecithin or in the form of acetonesoluble fraction of either. Such metal oxide groupings enter the lecithin-fluid fraction. Thereafter a modified metal oxide, partially in a suspended form, is developed partially dissolved in the fluid lecithin (such product can be utilized as a modified form of the fluid lecithin fraction). Such solid modified metal oxide thereafter can be sedimented from the modified oily fraction. Such modified form of metal oxides, instead of their initial form, can be used in such form. Or, the modified metal oxides can be placed into a water dispersion, whereafter the dissolved matter can in solution further interreact with reactive components dissolved in the same water, or can interreact with an additional reactive organic component (such as an unsaturated polymeric matter, in particular a latex), whereby such metal oxide matter with the lecithin groupings enters into the water dispersion. The lecithin-modified oxides can be used as paint pigments which are readily redispersible within the paint after storage (with or without addition of additional lecithin matter).

The vegetable lecithin can be, for example, soybean lecithin, corn lecithin and safflower lecithin. The lecithin can be used in the form of its oily fraction or acetone-soluble fraction. Such is obtained by mixing lecithin in its crude oil-carrier form with acetone, whereby an oily fraction of the crude lecithin is dissolved in the acetone and an insoluble fraction is precipitated, and separating the oily fraction or acetone-soluble fraction from the precipitated insoluble fraction. The lecithin can be used in the form of its acetone-insoluble fraction, after heating the lecithin with an oily matter from the group of triglyceride oils, which then reacts with the lecithin and thereafter becomes reactive. The animal lecithin, for example, can be egg lecithin.

The modified metal oxides, which are readily redispersible, can be as dispersion in fluids (liquids) and vehicles or in solutions jointly with unsaturated polymeric materials (such as in coating materials). Such modified metal oxides are readily redispersible after being stored for some time, without requiring for such ready redispersibility a separate addition of lecithin materials to such dispersions or solutions. The modified metal oxides can be used in paint compositions, being readily redispersible in such paints after extended storage. A modified metal oxide having a higher specific gravity can be used together with not-lecithin-heat-modified pigments of low specific gravity, with both the pigment and modified metal oxides being readily redispersible. The metal oxides, which have an increased rate of water solubility, such as allowing the lecithin-modified metal oxides to enter a solution in water, can be subjected, after addition of some acidity, to electrodeposition, with the present straight metal ions being deposited at the cathode of the analyzer and the reaction product between the metal groupings and the lecithin and a reactive additional polymeric component being deposited at the anode. The presence of the water dissolved products can so be identified. The metal oxides, which have an increased rate of water solubility, can be utilized in water solution for other obvious applications.

This invention also includes the metal oxides which have been modified by heating the metal oxides with lecithin, selected from the group consisting of plant lecithins, animal lecithins and acetone-soluble fractions thereof, which have increased redispersibility and solubility, that are useful in solvent-based and water-based coating materials and in other applications. A metal oxide, which has been reacted with lecithin matter, in the form of a component in the oily fraction (is utilized in such fluid fraction instead of using unreacted lecithin in subsequent applications. Lecithin or a lecithin fraction can be used which has been modified by the reaction with and the entry of a metal oxide in the form of interreaction products between the lecithin or lecithin fraction and such metal oxide.

DETAILED DESCRIPTION OF THIS INVENTION

In the drawings:

FIG. 5 is an infrared spectrum [with infracord spectrometer (samples in methylene chloride)] of lecithin reacted with $MoO_3$;

FIG. 6 is an infrared spectrum [with infracord spectrometer (samples in methylene chloride)] of the oily acetone-soluble fraction of oil-carrier lecithin reacted with red lead oxide;

FIG. 9 is an infrared spectrum [with the infracord spectrometer (samples in methylene chloride)] of oil-carrier lecithin (ALCOLEC S ®);

FIG. 10 is an infrared spectrum [with the infracord spectrometer (samples in methylene chloride)] of the acetone-insoluble fraction (separated from ALCOLEC S ® in acetone);

Figure 1:
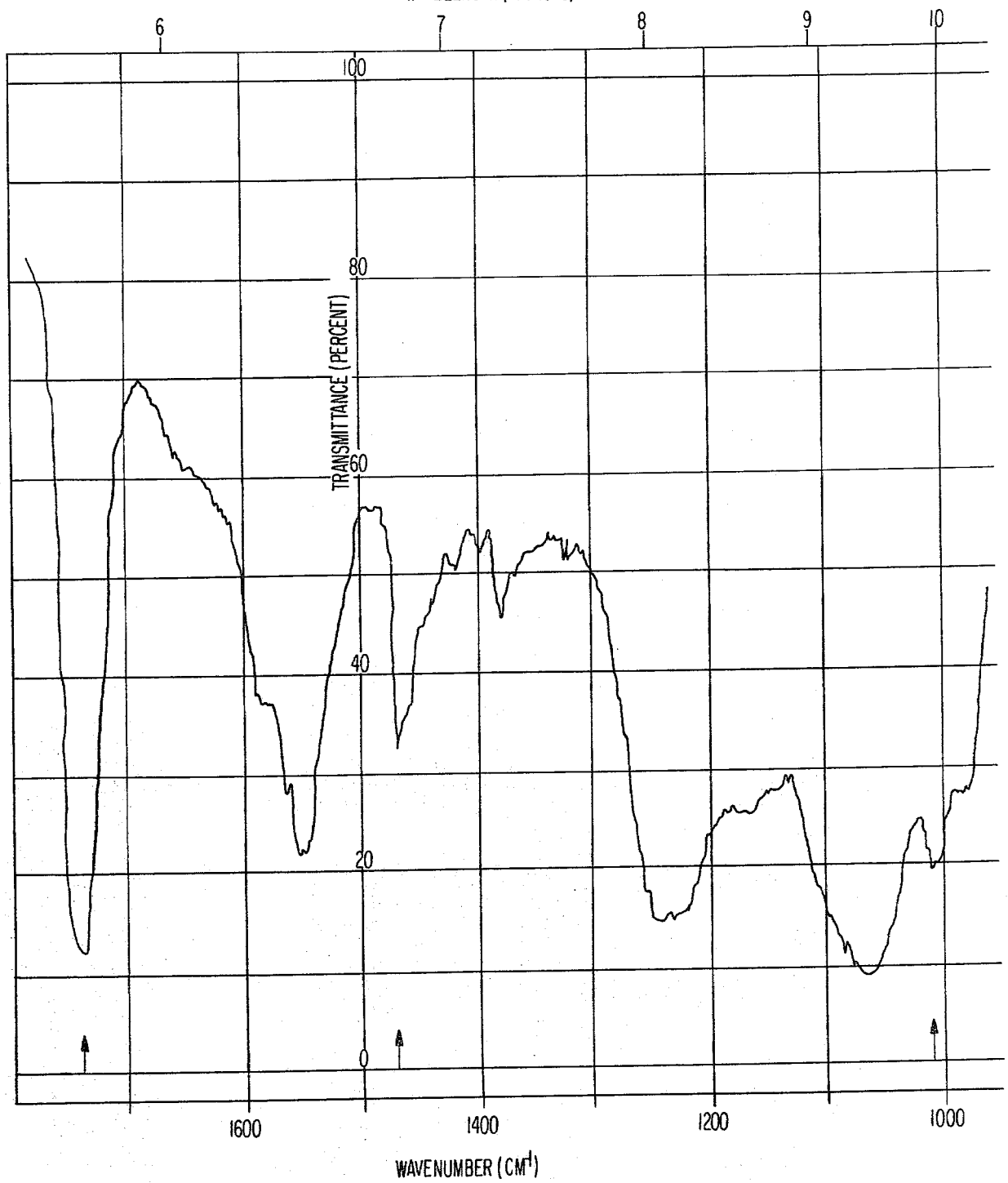
FIG. 1 is an infrared spectrum of soybean lecithin, granular (acetone-insoluble) in $CCl_4$.

This invention establishes that metal oxides can actually be chemically modified by treatment with lecithin materials and obtain therefrom new and desirable properties which they did not have before such treatment, and the lecithin treated oxides can therefore be utilized as materials having such new properties. At the same time, new modified lecithin materials are obtained.

This invention heat-reacts metal oxide particles, which thus can be used as novel chemically-modified pigments for dispersion in film-forming paint vehicles or thus can be used for other aims not representing paint compositions, such as being dissolved in fluids (even in water), as no longer aiding enhancing-components in the new compositions. This means that the new invention is not limited to a surface treating step before dispersing the metal oxide pigments, but is an actual chemical modification of the metal oxide itself. When such new lecithin reacted metal oxides have become part of water solutions, the dispersed units represent metal derivatives with organic lecithin-derived groupings, and can be used in such manner as well.

Therefore, the new heat-reacted metal oxide derivatives obtained from their heat reaction or other interreaction with lecithin matter are novel, and certainly were not to be expected from the prior art.

In another approach, this invention utilizes the fact that metal oxides can interreact with certain organic water-based polymer latices and it establishes that when lecithin enters into such a reaction system it also participates and the ratio of polymeric reaction products with the metal oxides is increased. This too is a novel matter and was not to be expected from the prior art.

This invention does not aim to form lecithin derivatives, but actually modifies the metal oxides directly so as to give new properties to the metal oxide. When in this invention red lead oxide is one of the metal oxides which is to be modified itself, the present process uses such metal oxide with considerable amounts of the lecithin material (such as 10 to 30 parts red lead oxide with 100 parts crude lecithin) and later removes the still not reacted residual lecithin, so as to isolate the modified metal oxide rather than to aim for a metal lecithin ester or similar compound. As such, removed residual lecithin material can later be recovered from the solvents used for its removal from the modified metal oxide; and as it can be used for further pigment treatments or otherwise, it is a new lecithin compound in which the lecithin has been modified by the metal oxide in a new way and recovered by separation from the modified mineral matter.

THE LECITHIN MATTER IN THIS INVENTION

When plant seeds such as soybean seed, corn seed, and other plant seeds are used to obtain their content of oily matter, oil-carrier lecithins are obtained as well. The difference is that the plant oils represent glycerin esters with three hydroxyl groups of the glycerin connected with three fatty acid groupings. In the lecithin component only two of the three hydroxyl groups are connected to fatty acid groups; the third hydroxyl group carries a phosphocholine group such as:

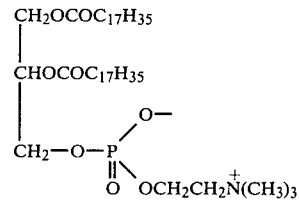

Typical lecithin

See Fieser and Fieser, "Advanced Organic Chemistry", Reinhold Publishing Co., p. 1005. The lecithins are also classified as phospholipids or as complex lipids.

When the lecithin fraction is isolated from the soybean seed or other plant seed, the crude lecithin product which is obtained contains a considerable amount of an "oil-carrier" substance and also contains associated phospholipids, especially phosphatidyl ethanolamine and phosphatidyl inositol. Preferably the first oil-carrier type crude lecithin is ALCOLEC S ® (American Lecithin Company), but other forms known in the art by such names as "Centrol, Sta-Sol, Yelkin", and others, can be used. And, besides the oil-carrier lecithins derived from the soybean, corresponding crude lecithins are derived from other plants such as safflower lecithin or corn lecithin and others. Or, lecithin can be derived also from animal sources such as egg lecithin and others.

When such crude lecithin is mixed with a surplus of acetone, the pure lecithin (mixed phosphatide) falls out as a white waxy mass. But the oil-carrier fraction goes into acetone solution. And when such solution is condensed by distilling or driving off the acetone, this fraction is recovered as a clear oily substance which during the distillation to remove the acetone gradually turns more and more intensively red. Such is therefore referred to in this invention as "red oil".

Both the crude oil-carrier lecithin and the "red oil" fraction can be used in the further course of this invention.

But an oil-free lecithin composition also can be made useful for utilization in this invention by first heating it with a polyhydroxyl fatty acid type oil, like soybean oil, at a temperature between 40° and 100° C., whereby again a modification of the pure lecithin takes place which can be used in this invention corresponding to the use of the oil-carrier lecithin forms.

THE METAL OXIDES WHICH ARE BEING USED IN THIS DEVELOPMENT

Metal oxides are widely present in nature, and they are also found in many derivative products. Further, metal oxides are obtainable in synthetical form, such as recovered from acidic treating baths of the metal industry or by heat treating recovered iron catalysts of the chemical industry under elevated temperature and flow of air and otherwise. In many respects, metal oxides are quite inert and require special modifications in order to transform them into new and useful forms. They differ widely in their specific gravity; and when different metal oxides are being used as color-carrying or hiding-power-producing components in film-forming fluid media, such different metal oxides have the tendency to separate from the dispersion as well as from each other due to the difference in specific gravity, and it is very difficult to reunite them and to redisperse them satisfactorily or completely.

That is why in U.S. Pat. Nos. 4,056,494 and 4,126,591, lecithin materials were introduced into the paint materials or surface coated the metal oxide with lecithin matter before mixing them into the paint dispersion. Those patents demonstrated that such coated-with-lecithin pigments showed higher suspension and were much more readily redispersed on remixing or shaking.

This invention actually modifies or changes the metal oxides by heating them with lecithin materials, which include oil-carrier lecithin or the acetone-soluble fraction which is herein referred to as "red oil". And when such lecithin modified metal oxides of this invention are separated and are later used themselves (alone) in new paint dispersions, they do not require the addition of lecithin matter or the coating with lecithin matter in order to show a higher degree of dispersion and willingness to redispersion than the not-treated metal oxides do.

THE TREATMENT OF THE METAL OXIDES WITH THE LECITHIN MATERIALS

To introduce an interreaction between the metal oxides and the lecithin materials which goes beyond a limited surface-wetting, or surface-coating, of the metal oxide particles, the metal oxides are mixed uniformly with the lecithin materials.

In order to assure an extensive degree of interreaction of the metaloxides used, it is possible to use hereby a higher amount of lecithin than the amount of metal oxide used and later to remove any unreacted surplus of lecithin by washing the modified metal oxide with solvents which are suitable for dissolving remaining free lecithin matter. After mixing, they are heated gradually to a temperature of between 100° and 160° C. with occasional mixing of the heated material. Thereby some of the metal oxide reacts with the liquid lecithin or "red oil" fraction and later can be identified as a part of the composition. Or, the not dissolved fraction is itself so modified that after removal from the heat source and after cooling, the so-modified oxide settles out of the fluid fraction. The fluid fraction and the solid sediment can be separated. The solid matter can then be pressed against filter paper to remove adherent oily matter or the solids and the oily matter can be separated otherwise. It is possible to purify the solids from still-adherent oily fraction by washing the pigmentation with solvents, such as hexane, whereafter the solid, modified metal oxide can be recovered by evaporation of the solvent.

This thereby obtained modified metal oxide has increased solubility and, often, modified color and much increased redispersibility in fluid vehicles from where it might have settled out.

That the metal oxides have actually chemically reacted with the lecithin has been established by infrared spectroanalysis, comparing thereby the acetone-insoluble soybean lecithin, such as known as "purified soybean phosphatides" (or, as "lecithin granules"), with the acetone-insoluble fractions of the interreaction products between an oil-carrier type soybean lecithin (like AL-COLEC S ®) with such metal oxides as red lead oxide (lead orthoplumbate) or a lead dioxide (lead peroxide) or a molybdenum trioxide—subjecting the test samples to a dispersion in carbon tetrachloride. Then the spectra were taken, using a Perkin-Elmer, Model 621, infrared spectrophotometer. Three bands where the interreaction was especially clearly evident are: between 1775 $cm^{-1}$ and 1780 $cm^{-1}$, at 1470 $cm^{-1}$, and at 1010 $cm^{-1}$. In the first of these bands the unmodified lecithin had an absorbence of 87 percent. After reaction with lead orthoplumbate the absorbence is 73 percent; with molybdenum trioxide it was 70 percent and after treatment with lead peroxide it had decreased to 45 percent. At the position of 1740 $cm^{-1}$ corresponding changes took place for these modifications, with variations from 68 percent absorbence for the straight lecithin to 60 percent; and to 52 percent; and to 42 percent. Hereby the depth of the band covers 22 percent-units, or 21 units, or 14, and for the peroxide 10 percent-units in the spectrum charts. The relation between these different extents of interreaction and the resulting properties of the lecithin-treated metal oxides is shown in numbered Example 22. On the other hand, at another position (at 1010 $cm^{-1}$) the band increases with the obtained modifications from 4.5 percent units length: for the product with lead orthoplumbate, 8 percent transmission units;

that with molybdenum trioxide, 17 units; and for the product with lead peroxide, 22 units. This indicates that in the interreactions, old band positions are decreased and others newly formed or increased as well.

Also, the acetone-soluble fraction of the oil-carrier lecithin showed after reacting with metal oxides clearly developed changes in the infrared spectrum. These studies were made, for instance in comparing such oily fractions without and with metal oxide treatments in dispersion in methylene chloride (dichloromethane), using the Perkin-Elmer Infracord spectrometer. Here the changes clearly appeared in the wavelengths between 6 and 9.5 microns. Especially between 6 and 7 microns new bands were developed which did not exist in the unreacted oily fraction. These studies were made in particular on the reaction products with lead orthoplumbate and molybdenum trioxide, and with a magnesium oxide [whereby the modification had been made by heating 15 g of magnesium oxide with 70 g of oil-carrier lecithin (ALCOLEC S ®) within 30 minutes to 140° C.].

Also, the colors of the products varied widely, from a light yellow straight lecithin to brownish and deep bluish and nearly black for the various metal oxide reaction products. When the oil-carrier type soybean lecithin (ALCOLEC S ®) was heated with magnesium oxide, the isolated acetone-insoluble reaction product was pale yellow.

Most of the metal oxides which are used as pigments are (before the treatment according to this invention) insoluble in water, or, at least soluble only to a very low extent. The lecithin-modified metal oxides of this invention have a very much increased water-solubility and therefore can be introduced into water solution. This is clearly demonstrated in the numbered examples herein.

This dissolving of the lecithin-modified metal oxides in water can be done by heating them in water, or the modified pigments can be introduced in water-solution by ball-milling them in water for one or several days, even at room temperature.

When some of such lecithin-modified metal oxides have entered the water, the transmission reading of such water, using the Coleman, Model 8, colorimeter, shows the decreasing transmittance of the water solution corresponding to the percentage of dissolved matter. In the water solution the amount of entered reaction product can be established by determining the metal content present in the solution, using atomic absorption analysis. This is shown in Example 14 below.

Also, the ratio of the entered lecithin matter and the entered metal components can be determined from the water solutions, by taking the ethyl-ether-soluble fraction out of the solution by shaking of the water solution with ethyl ether. After the ether has evaporated, the residue can be taken up with carbon tetrachloride and subjected to infrared analysis. This also is shown in Example 14 below.

Such lecithin-modified metal oxides are reactive in water also with water-dispersed organic polymers, such as latices. That means that the ball-milling of such lecithin-modified metal oxides in a water-dispersed latex, such as acrylic latex, produces in the water a product resulting from such components.

In all of the numbered examples herein, the metal oxides are used in the form of inorganic materials.

In U.S. Pat. No. 2,997,398, metal-lecithin products were used as additives to otherwise prepared "coating compositions consisting essentially of pigmentation and a drying vehicle". The prepared additives were added in the form of 1 to 6 percent "metal phosphatides" or "metal lecithinates" or "phosphorylated phosphatides". Such amount was based as a percentage of the pigment weight. This clearly identifies the fact that this invention is independent from the teachings of U.S. Pat. No. 2,997,398. In this invention, the metal oxide or the pigment itself is directly reacted with the lecithin material and so a new composition is produced and is utilized as the reaction-modified metal oxide.

The metal oxides used in particular in developing the procedures of this invention were oxides of lead, molybdenum, copper, iron, zinc, cadmium and titanium, but other metal oxides are also useful. Of special practical importance, it was found that such oxides of high specific gravity such as red lead of the industry [the lead orthoplumbate ($Pb_3O_4$), which has been used in coatings for the protection of iron and steel structures for about 2000 years], after the lecithin treatment, no longer separates into hard sedimentation, such as had been the case of the untreated pigment generally. Such hard sedimentations are difficult to redisperse in the coating compound. The new modified material of this invention (when dispersed in coating vehicles) can, after extended storage, settle in a redispersible kind of sedimentation. This can readily be reshaken or remixed into useful dispersions of high hiding power and therefore of uniform protective effects. In this case the metal oxide is used as a solid, modified pigmentation in the newly prepared coating material.

In some of the numbered examples below, the fact is established and utilized that under the lecithin treatment, water-insoluble metal oxides can enter organic solutions as well as into water solutions and can be used from there.

The following numbered examples set forth the preferred embodiments of this invention.

EXAMPLE 1

Metal oxide Treatment With Lecithin Matter 30 grams of red lead oxide pigment (lead orthoplumbate) were heated with 100 grams of crude soybean lecithin (oil-carrier lecithin) (ALCOLEC S ® of the American Lecithin Company). The heating was extended for 20 minutes (or more or less)—heating up to 130° C. After allowing to settle overnight, the upper oily layer was removed. The settled-out reaction product was separated, and washed repeatedly with a volatile solvent, like hexane. The settled out reaction product was filtered off again, washed with hexane again and was allowed to dry. The so-treated material was used as "Modified Red Lead Pigment".

In the oily layer the amount of entered red lead matter varies with the amount of pigment used. This was shown since the oily fraction (from heating 10 g of red lead in 100 g of crude oil-carrier lecithin) shows, after dispersion in hexane, different transmission from the oily fraction obtained from heating 30 g of red lead in 100 g of crude lecithin.

Such transmission readings were made using different concentrations made, containing:
  1 part oily fraction and 1 part Hexane (50% solution)
  1 part oily fraction and 3 parts Hexane (25% solution)
  1 part oily fraction and 7 parts Hexane (12.5% solution)
  1 part oily fraction and 15 parts Hexane (6.25% solution)

1 part oily fraction and 31 parts Hexane (3.125% solution)

See Table 1. Each concentration was measured for its transmission using the 1:1 solution as standard. The measurements were made using a COLEMAN COLORIMETER, Model 8; the readings show that the percent transmission decreased for each concentration with the amount of red lead oxide used in the heat treatment.

TABLE 1

TESTED: THE OIL FRACTION IN HEXANE: TRANSMITTANCE VALUES

| Concentration | 1:1 solution of oil-carrier lecithin ALCOLEC S ® and hexane | 10 g of red lead heated with 100 g ALCOLEC S ® | 30 g of red lead heated with 100 g of ALCOLEC S ® |
|---|---|---|---|
| 25% solution | 96 | 53 | 47.5 |
| 12.5% solution | 109 | 72 | 53.5 |
| 6.25% solution | 122 | 93.2 | 74.4 |
| 3.125% solution | 133 | 114.6 | 101.6 |

EXAMPLE 2

TABLE 2

Corresponding Tests With Different Oil-Carrier Lecithins
TRANSMISSION VALUES

| Concentration | 1:1 Solution of Lecithin and Hexane | 30 g of red lead and 80 g of lecithin, heated 30 min to 120° C. | Compared With ALCOLEC S ® |
|---|---|---|---|
| (a) Using A Commercial "Control" Oil-Carrier Lecithin | | | |
| (Using 25% ALCOLEC S ® as the Standard) | | | |
| 25% solution | 105.5 | 53.2 | 47.5 |
| 12.5% solution | 117.7 | 62.1 | 53.3 |
| 6.25% solution | 128 | 77.2 | 74.4 |
| 3.125% solution | 138.8 | 102.0 | 101.6 |
| (b) Using Commercial Oil-Carrier Lecithin "Sta-Sol" | | | |
| (Using 25% ALCOLEC S ® As The Standard) | | | |
| 25% solution | 107 | 50.8 | 47.5 |
| 12.5% solution | 123 | 58.2 | 53.3 |
| 6.25% solution | 135.6 | 82.1 | 74.4 |
| 3.125% solution | 155 | 99.0 | 101.6 |

Hereby the transmission is lowered because a part of the metal oxide has entered the oily lecithin matter. There are variations between different kinds of these lecithins which appear also in their infrared spectra before and after treatment with metal oxides. But the effect of the metal oxide treatment on the transmission is the same. See Table 2.

EXAMPLE 3

The Remaining Reactivity In The Lecithin Material After One Such Treatment

In order to demonstrate that a crude lecithin after being once used in Example 2 still maintains a certain degree of further reactivity with the metal oxide, such ALCOLEC S ® heat treated with red lead according to Example 2 was used a second time with a second amount of red lead and new changes of transmission took place:

TABLE 3

| | Transmission Values | |
|---|---|---|
| Concentration | After First Treatment: 30 g of red lead and 40 g of ALCOLEC S ® | Double Treated: 130 g of ALCOLEC S ® already treated with red lead, once more treated with 30 g of red lead pigment |
| 25% solution | 47.3 | 46.3 |
| 12.5% solution | 52.9 | 47.3 |
| 6.25% solution | 66.6 | 51.2 |
| 3.125% solution | 91.0 | 64.2 |

EXAMPLE 4

Using Lecithin of Various Plants

The influence of plant lecithin is not limited to soybean lecithin. This is shown by using instead of soybean lecithin either a safflower lecithin or a corn lecithin in corresponding applications. Other plant lecithins can be used in the same manner. Again the transmission readings of the oily fractions are compared (see Table 4) after the settling out of the lecithin treated metal oxide.

TABLE 4

Comparative Transmission Readings Of The Hexane Solutions From Oily Fractions Obtained From Heated Red Lead Oxide With Lecithin Of Different Origin

| | Transmission Values | |
|---|---|---|
| Concentration | The Lecithin in Hexane | After Red Lead Treatment (The Oily Fraction in Hexane) |
| (a) Using Crude Oil-carrier Soybean Lecithin (ALCOLEC S ®) | | |
| 25% solution | 100 (Used as Standard) | 49.7 |
| 12.5% solution | 110 | 49.7 |
| 6.25% solution | 121 | 49.7 |
| 3.125% solution | 131 | 51.5 |
| Other Lecithins Used (80 g) with the same 30 g of red lead and heated the same way: | | |
| (b) Using a Safflower Lecithin (with the same standard) | | |
| 25% solution | 57.8 | 49.5 |
| 12.5% solution | 74.4 | 50.4 |
| 6.25% solution | 104.0 | 55.8 |
| 3.125% solution | 129.0 | 70.0 |
| (c) Using Corn Lecithin (with the same standard) | | |
| 25% solution | 49.7 | 49.5 |
| 12.5% solution | 49.9 | 49.5 |
| 6.25% solution | 51.2 | 49.8 |
| 3.125% solution | 54.0 | 51.0 |

Note:
Corn lecithin has limited solubility in hexane and therefore the solutions are opaque and the difference is less pronounced.

EXAMPLE 5

Using an Egg Lecithin

The effectiveness of the lecithin according to this invention is not limited to plant lecithin. As an example of an animal lecithin, the egg lecithin was used with the following results—the same standard was used as in Example 4.

TABLE 5

| Concentration | Transmission Values | |
|---|---|---|
| | The lecithin in Hexane | After Red Lead Treatment (The Oily Fraction In Hexane) |
| 25% solution | 93.5 | 49.7 |
| 12.5% solution | 109.5 | 50.0 |
| 6.25% solution | 122.0 | 55.0 |
| 3.125% solution | 133.0 | 76.5 |

EXAMPLE 6

Using The Acetone-Soluble Fraction Of Oil-Carrier Lecithin ("Red Oil")

In the preceeding examples the crude oil-carrier lecithins were used in such studies. But when such an oil-carrier lecithin is mixed with acetone, only the oil-carrier fraction with its lecithin groupings goes into an acetone solution. Most of the pure lecithin is not acetone soluble and is precipitated. But the isolated oil-carrier fraction (or hereafter referred to as "red oil'-'—because of its property of turning red on heating) can be recovered by distilling off the acetone from the solution. When this "red oil" is then diluted with hexane and their transmission is compared, the reactivity of the "red oil" with the metal oxides is evident:

TABLE 6

| Concentration | Transmission Readings Of The Hexane Solutions | |
|---|---|---|
| | Heated Red Oil | Red Oil Heated with Red Lead (20 g of red lead and 100 g of red oil) The Oily Fraction |
| 50% solution in Hexane | 70 | 47.5 |
| 25% solution in Hexane | 139 | 47.5 |
| 12.5% solution in Hexane | 213 | 48.0 |

TABLE 6-continued

| Concentration | Transmission Readings Of The Hexane Solutions | |
|---|---|---|
| | Heated Red Oil | Red Oil Heated with Red Lead (20 g of red lead and 100 g of red oil) The Oily Fraction |
| 6.25% solution in Hexane | Off scale | 48.0 |
| 3.125% solution in Hexane | — | 50.5 |
| 1.567% solution in Hexane | — | 61.0 |

The considerable reactivity of the "red oil" in these treatments is evident.

EXAMPLE 7

Applying The Red Oil Treatment To Different Metal Oxides

To demonstrate that the effect is the same when other metal oxides are heated with the red oil, the following examples are given in comparison to the red oil data in Example 6:

TABLE 7

| (a) Concentration | Transmission Values | |
|---|---|---|
| | 10 g of Molybdenum Trioxide Heated With 100 g of red oil to 140° C. | Same Oily Fraction Heated Again with the same Amount of New Molybdenum Trioxide |
| 50% solution in Hexane | 49 | 48 |
| 25% solution in Hexane | 74 | 48 |
| 12.5% solution in Hexane | 157 | 48 |
| 6.25% solution in Hexane | Off Scale | 54 |
| 3.125% solution in Hexane | — | 123 |

| (b) Concentration | 20 g of Rutile Titanium Dioxide | 60 g of Rutile Titanium Dioxide |
|---|---|---|
| Undiluted in Hexane | 48 | 46 |
| 50% solution in Hexane | 55 | 46 |
| 25% solution in Hexane | 75 | 47.5 |
| 12.5% solution in Hexane | 105 | 48 |
| 6.25% solution in Hexane | — | 51 |
| 3.125% solution in Hexane | — | 70.5 |

| (c) Concentration | 20 g of Zinc Oxide heated with 200 g of red Oil | 20 g of lead monoxide heated with 200 g of red oil |
|---|---|---|
| 50% solution in Hexane | 88 | 81 |
| 25% solution in Hexane | 137 | 109 |
| 12.5% solution in Hexane | 178 | 140 |
| 6.25% solution in Hexane | 209 | 156 |

This data shows the different effects of the selected metal oxides and the selected ratio between metal oxide and red oil.

EXAMPLE 8

Applying Different Metal Oxides To This Treatment With Oil-Carrier Lecithin

The same reactivity with varying metal oxides applies also to the crude oil-carrier lecithin as was shown with red oil in Example 7.

TABLE 8

| Concentration | Transmission Values | |
|---|---|---|
| | 16 g of Rutile Titanium Dioxide Heated With 100 g of ALCOLEC S ® | 16 g of Molybdenum Trioxide Heated with 100 g of ALCOLEC S ® |
| 25% solution | 45 | 45 |

TABLE 8-continued

| | Transmission Values | |
|---|---|---|
| Concentration | 16 g of Rutile Titanium Dioxide Heated With 100 g of ALCOLEC S ® | 16 g of Molybdenum Trioxide Heated with 100 g of ALCOLEC S ® |
| 12.5% solution in Hexane | 45 | 47 |
| 6.25% solution in Hexane | 45 | 62 |
| 3.125% solution in Hexane | 45 | 97 |

The comparative date on heating ALCOLEC S ® with red lead is given in Example 2.

EXAMPLE 9

Modification Of Metal Oxides With Lower Amounts Of Lecithin

In the preceding examples, metal oxides were modified by heat treatment with amounts of oil-carrier lecithin which were higher than the amount of metal oxide used. This was done in order to obtain a complete wetting of the metal oxide surfaces for obtaining a more complete interreaction.

When smaller amounts of lecithin are used, the wetting can be increased by diluting the pigment-lecithin mixture with a suitable volatile solvent and proceeding with the heating afterwards. In two tests, 40 g of red lead oxide was either heat treated with oil-carrier lecithin (ALCOLEC S ®) and 25 g of xylene (ratio: 1 pigment to 1 lecithin), or 40 g of red lead-lecithin was heated with 30 g of oil-carrier lecithin and 35 g of xylene (ratio: 4 pigment to 3 lecithin). After heating and allowing the dispersed modified pigment to settle out, the oily fraction was heated to evaporate the volatile solvent and the residual oily fraction was studied in its infrared spectrum. The spectra vary with the changing ratio of lecithin, because a corresponding degree of interreaction has taken place.

EXAMPLE 10

Limited Influence Of A Second Lecithin Treatment On Once-Treated Pigmentation

After these treatments with lecithin the metal oxides have different properties than before. One such difference is shown by comparing the oily fraction of a red oil which in one case has been heated with red lead oxide (untreated) and which another time has been heated with an already once-treated red lead oxide.

TABLE 9

| | Transmission Readings | | |
|---|---|---|---|
| Concentration | Heated Red Oil Alone in Hexane | Red Oil Heated With Red Lead Oxide | Red Oil Heated With Once-Already-Treated-And-Recovered Red Lead |
| 50% hexane solution | 70 | 47.5 | 94 |
| 25% solution | 139 | 47.5 | 156 |
| 12.5% solution | 213 | 48.0 | 220 |
| 6.25% solution | Off Scale | 48.0 | Off Scale |

EXAMPLE 11

The Treated Metal Oxides Increase In Water Solubility. This Can Be Established By Measuring The Transmission Of the Water Solutions

TABLE 10

| (a) Rutile Titanium Dioxide (5 g of Treated Pigment Ballmilled in 50 g of Water or Heated) Transmission: Water Solution | Untreated Water Insoluble | Transmission Values | |
|---|---|---|---|
| | | Treated By Ballmilling at R.T. | Heated 30 min in Water |
| Not Further Diluted | | 99.0 | 47.0 |
| 50% Solution | | 99.5 | 51.5 |
| 25% Solution | | Above 99.5 | 59.5 |
| 12.5% Solution | | Above 99.5 | 73.0 |

| (b) Zinc Oxide (2 g pigment treated with Red Oil (20 g), filtered to remove traces of adherent Red Oil Transmission: Water Solution | UNTREATED: Soluble 0.00042g/100 cc 18° C. |
|---|---|
| Not Further Diluted | 84.5 |
| 50% Solution | 90.0 |
| 25% Solution | 94.0 |
| 12.5% Solution | 98.0 |

| (c) Molybdenum Trioxide Treated With Red Oil (8 g Treated Pigment Heated in 160 g Water) | 10 g of MoO₃ Heated with 100 g of red oil. Solid; recovered and rinsed. Then heated in Water | 30 g of MoO₃ Heated With 100 g of red oil solid Recovered and Rinsed (8g/160 g of water) |
|---|---|---|
| The Water as Obtained After Heating | 88.5 | 78.0 |
| Concentrated to 50% Volume | 64.0 | 55.0 |
| Concentrated to 25% Volume | 48.5 | 47.0 |
| Concentrated to 12.5% Volume | 46.5 | 46.5 |

EXAMPLE 12

Establishing The Interreaction By Infrared Spectroscopy

A ready method to establish that metal oxides reacted with the lecithin matter, and that thereby unsaturated spectrum bands are consumed, was applied to various lecithins besides soybean lecithin, when red lead oxide was treated with soybean lecithin, safflower lecithin, corn lecithin or with egg lecithin. When each of these lecithins, before and after the heating with red lead oxide, was dispersed in dichloromethane and the Infrared Spectra were taken using an Infracord Spectrometer, well-developed bands were present before the interreaction with the metal oxide, which were considerably decreased or which disappeared after the same lecithin had been heated with the metaloxide. See FIGS. 5 to 10.

EXAMPLE 13

Lecithin Modified Metal Oxides In Water

After the metal oxides had been heat treated with the oil-carrier lecithin and afterwards had been separated from the oily fraction, had been purified with organic solvents and had been dried, such lecithin-modified pigment can in boiling water not only partially enter the water solution, but can also give off reacted lecithin matter into the water, which will influence the viscosity of the water after cooling and will influence the filterability of the water which contains this released matter.

EXAMPLE 14

Figure 11:
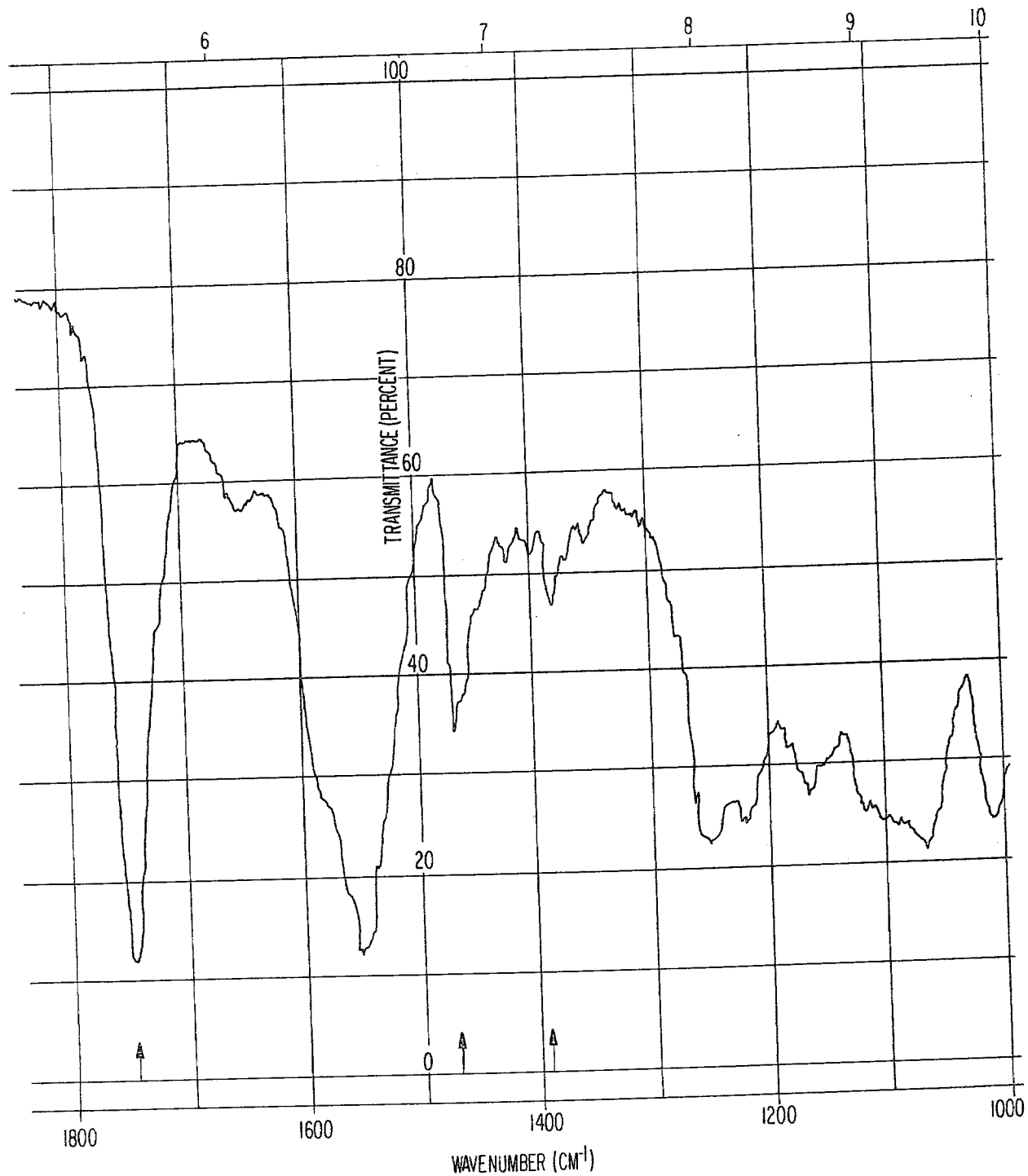
FIG. 11 is an infrared spectrum of an ether extract from immersion water of red lead modified with the oily fraction of acetone, separated oil-carrier lecithin (ALCOLEC S ®)
Figure 12:
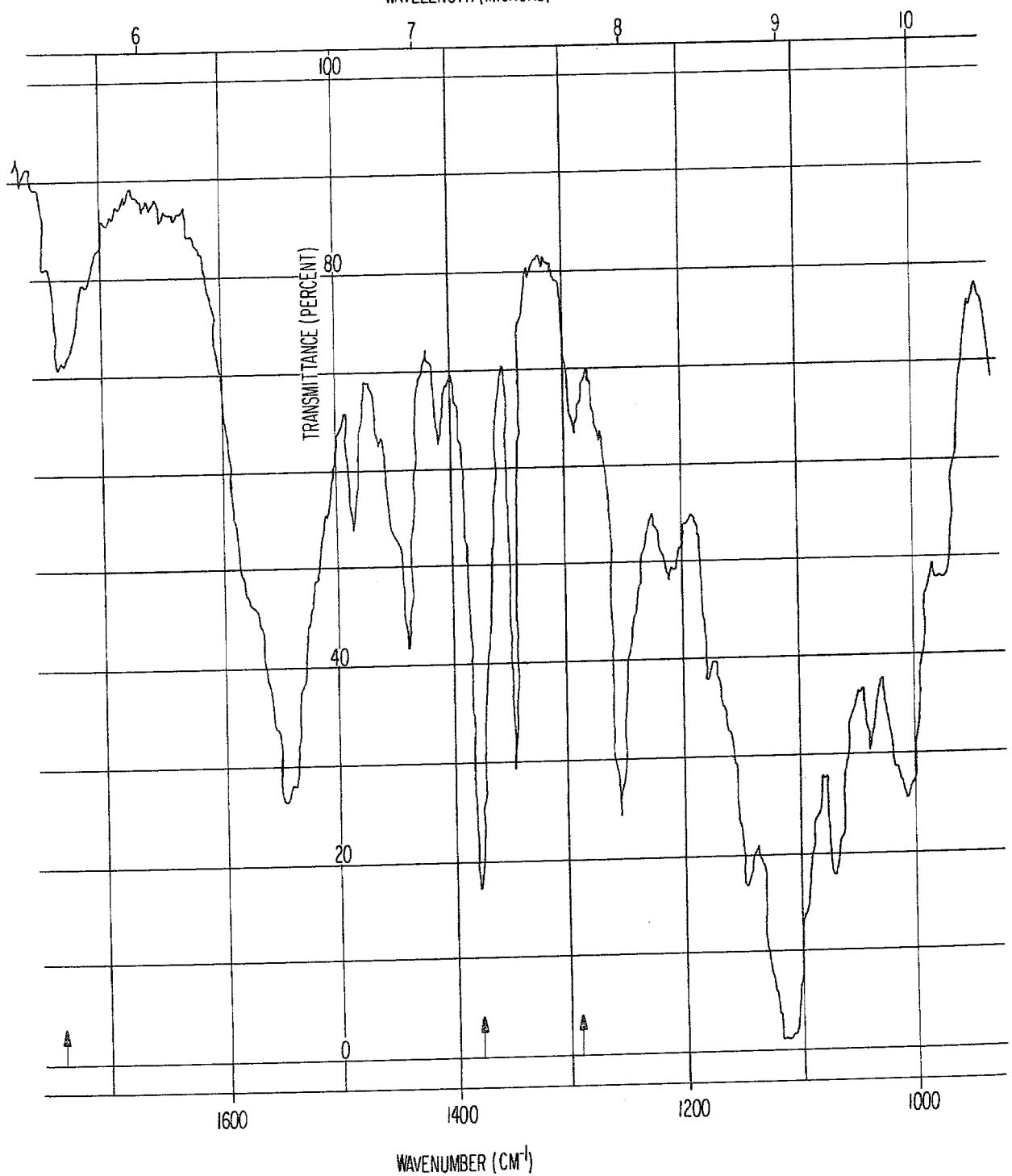
FIG. 12 is an infrared spectrum of an ether extract from immersion water of red lead modified with the acetone-insoluble fraction of separated oil-carrier lecithin (ALCOLEC S ®)

Determining The Entered Metal Component In The Water, After Lecithin Treated Metal Oxides Have Been Partially Entered Into The Water Solution The interreaction between the metal oxide and the lecithin matter can also be established so that the lecithin treated metal oxide, for instance red lead oxide, is (after separation of the pigment from the oily fraction) washed extensively with hexane and after drying it and immersing it in water and heating the water until reaching the boiling point. In spite of the fact that according to the *Handbook Of Chemistry And Physics*, 53rd Edition, page B-102, the red lead oxide is insoluble in cold and in hot water, the water can, after introducing the lecithin-modified red lead oxide, be tested for lead in the water solution, using the Atomic Absorption method and using the Perkin-Elmer Atomic Absorption Spectrometer Model 290. See FIGS. 11 and 12.

(a) The water [in which 9 g of red lead oxide-treated with the oily lecithin fraction (red oil fraction of oil-carrier lecithin) and containing 8.16 g of lead had been introduced into 110 g of water under heating up to the boiling point] showed afterwards in the water an absorbence reading of 8.5 percent or a lead content of 9.2 parts per million or 9.2 mg of lead per liter or 1.002 milligram in the 110 g water solution.

(b) When red lead oxide had been heated with oil-carrier lecithin (ALCOLEC S ®) at 140° C. and the reaction product had been separated with acetone into an acetone-soluble oily fraction and an acetone-insoluble solid fraction and when each fraction had been heated in water up to the boiling point, the water in which the oily fraction had been entered contained afterwards 10.3 parts per million of lead.

The water in which the solid fraction of the reaction product had been entered released the water and the lead matter together with some co-reaction lecithin. This water afterwards did not filter through filter paper No. 1 or No. 2. But when some ether-soluble material had been taken out by shaking with ethyl ether, the remaining water solution could then be filtered and contained 5.8 parts per million of lead.

This lead, which is measured in the water solutions, had not only been released from the reaction product, it was then even water soluble in the water solution. This is a characteristic which the unreacted red lead oxide did not have.

EXAMPLE 15

Studying The Released Lecithin Reaction Product In The Immersion Water Of The Treated Metal Oxides By Infrared Analysis The difference between the reaction product of a red lead oxide once with the oily fraction of an acetone-separated oil-carrier lecithin (ALCOLEC ®) and the other time with the solid fraction was studied after immersion of each product in water and after taking the released matter from there up with ethyl ether by shaking the release water with the ether. Then the ether was driven off from that extract and the extracted residue was dispersed with carbon tetrachloride and subjected to infrared analysis with the Perkin-Elmer Spectrophotometer Model 621. The ether extract from the water [in which the product had been immersed where the red lead had been treated with the oily fraction (red oil fraction)] showed a strong lecithin transmission band at 1740 to 1750 cm$^{-1}$ and also at 1470 cm$^{-1}$, but only minor metal modifications around 1500 to 1250 cm$^{-1}$.

The ether extract from the water [in which the red lead had been immersed which had been treated with the acetone-insoluble fraction] showed a much smaller lecithin band at 1740 cm$^-$ but a very strong content of metal reaction product between 1500 and 1250 cm$^{-1}$. And this reaction product had been released in a water-soluble form in which it had been in the water solution before being taken off by shaking with ethyl ether.

EXAMPLE 16

The Effect of Lecithin-Modified Pigments (Metal Oxides) In Paints

The lecithin-modified metal oxide pigments were used in corresponding paint formulations and then allowed to stand. The red lead paint without lecithin treatment had formed (after 5 weeks storage) a very dense sedimentation which did not redisperse on shaking. The lecithin-modified sedimentation fully redispersed, even though there was no additional lecithin added to its paint preparation.

TABLE 11

| Red Lead Treatment | | | Molybdenum Trioxide Treatment | | |
|---|---|---|---|---|---|
| Untreated Pigment | | Treated Pigment | Untreated Pigment | | Treated Pigment |
| 50 g | red lead oxide | 50 g | 12.5 g | molybdenum trioxide | 12.5 g |
| 25 g | linseed oil | 25 g | 6.2 g | linseed oil | 6.2 g |
| 8 g | bodied oil | 8 g | 2.0 g | bodied oil | 2.0 g |
| 12 g | odorless paint thinner | 12 g | 3.0 g | odorless paint thinner | 3.0 g |
| 2 g | cobalt naphthenate (6%) | 2 g | 0.6 g | cobalt naphthenate 6% | 0.6 g |

To establish that the paint with the treated pigment is after storage more fully dispersible than the paint with the untreated pigment, the paints were (after 5 weeks storage and after remixing) applied to a white surface with high reflectance. With increased dispersion and so-increased hiding power, the applied coatings then decreased in reflectance, and the results are shown as follows:

TABLE 12

| Reflectance Readings On The Applied Redispersed Paints On White Background (With The Photovolt Reflectometer) | | | | |
|---|---|---|---|---|
| | Red Lead Paint After 5 Weeks | | Molybdenum Trioxide Paint After 5 weeks | |
| Filter | Untreated | Treated | Untreated | Treated |
| Green | 53.5 | 39 | 61.5 | 35.5 |
| | 54.5 | 39 | 61.5 | 36 |
| Amber | 60 | 56 | 60 | 34 |
| | 58 | 56.5 | 62 | 34 |
| Blue | 28 | 5 | 54 | 39 |
| | 31 | 5 | 55 | 38.5 |
| | 27.5 | 6 | 56 | 39 |

EXAMPLE 17

Mixed Pigmentation Between Treated And Untreated Pigment Components

In paints with mixed pigmentations, having one pigment of low specific gravity [like rutile titanium dioxide (spec. gravity = 4.2)] and the other of high specific gravity [like red lead oxide (spec. gravity: 9:10)], it was possible (i) to prepare the paint either using additional lecithin (like 2.5 percent of pigmentation) of (ii) to use both pigments after each had been lecithin treated, no longer requiring additional lecithin for redispersion after storage, or (iii) to use the high specific gravity pigment after lecithin treatment and to add the low specific gravity pigment without lecithin treatment. In this case either a certain percent of lecithin can be added, or the redispersion can be obtained due to the lecithin treatment of the heavy pigment and with the light pigment suspended within the redispersed paint.

In such a case a combination has been used of 50 g of red lead oxide, 60 g of rutile titanium dioxide, 55 g of soybean oil alkyd, and longoil 70%, and diluted with 60 g of mineral spirits.

EXAMPLE 18

Influence Of The Selected Lecitin Treatment On The Reflectance Of The Pigmented Paint To compare the influence of the selected lecithin used for modifying a metal oxide, red lead oxide was modified in accordance with this invention using lecithins of different origins (i.e. using three different vegetable and one animal lecithin). Using the pigment with each of these modifications, a test paint was prepared based on the formulation:

- 30 g of modified red lead oxide
- 15 g of linseed oil
- 4.8 g of soybean modified long oil alkyd resin AROPLAZ 1266 M 7C
- 7.5 g of odorless paint thinner
- 1.2 g of cobalt naphthanate 6% Co Each paint was applied to a primed surface and reflectance readings were made with a PHOTOVOLT Reflectometer:

| Filter | Reflectance Values | | | |
|---|---|---|---|---|
| | Soybean Lecithin | Egg Lecithin | Corn Lecithin | Safflower Lecithin |
| Blue | 4.5 | 3.9 | 6.5 | 6.0 |
| | 4.6 | 4.1 | 5.5 | 5.0 |
| | 4.8 | 4.0 | 6.5 | 5.0 |
| Green | 35.0 | 35.2 | 34.5 | 35.7 |
| | 35.5 | 34.0 | 34.0 | 35.0 |
| | 36.2 | 34.3 | 33.2 | 34.0 |
| Amber | 52.3 | 50.0 | 51.0 | 52.8 |
| | 51.2 | 48.2 | 49.2 | 50.2 |
| | 51.7 | 48.8 | 50.0 | 49.5 |

EXAMPLE 19

The Activity Of A Water-Dispersed Modified Metal Oxide In The Water Solution In order to establish that the metal oxide matter which had been heat treated with red oil could afterwards be partially dissolved in water, molybdenum trioxide was treated with red oil according to Example 10 and the undissolved solid part of the modified metal oxide was recovered and rinsed with hexane to remove an adherent residual oily fraction.

Then 10 grams of the solid product was dissolved by heating in 4000 ml of water and the solution was filtered to obtain a clear solution. This solution was used (instead of untreated molybdenum trioxide) in an acidic phosphatizing solution and was applied to automotive steel. A reaction coating was obtained on the steel with a stripping weight (that is, an acid-removable-coating weight) of 91 mg per square foot, corresponding to the reaction coating obtained when the molybdenum trioxide would have been introduced directly into the acidic phosphatizing solution instead of being introduced as a water solution of the modified product.

Figure 13:
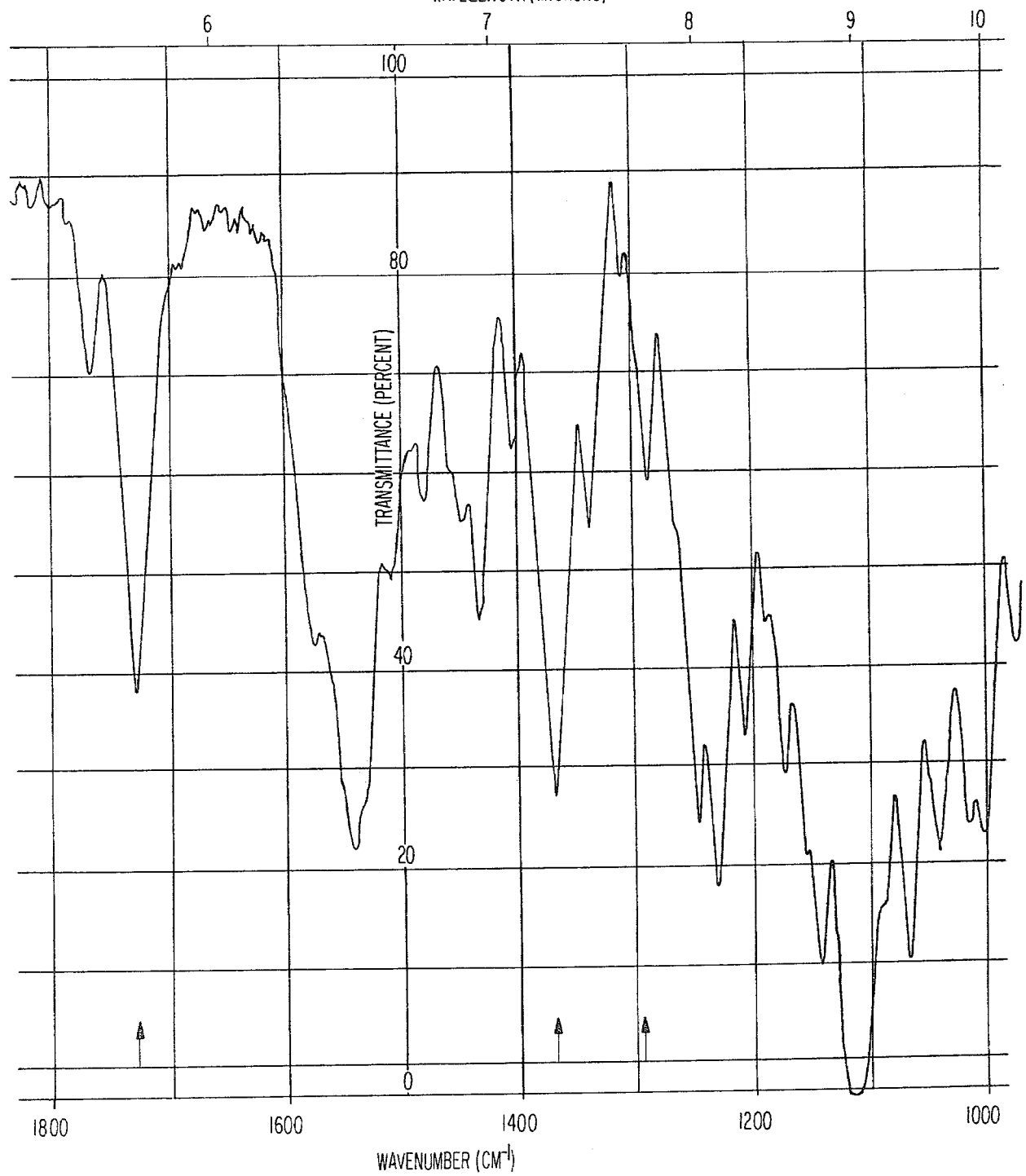
FIG. 13 is an infrared spectrum of the material with phosphatizing treatment with $MoO_3$ and polyvinyl alcohol, but without lecithin treatment of the $MoO_3$ before use in the bath.
Figure 14:
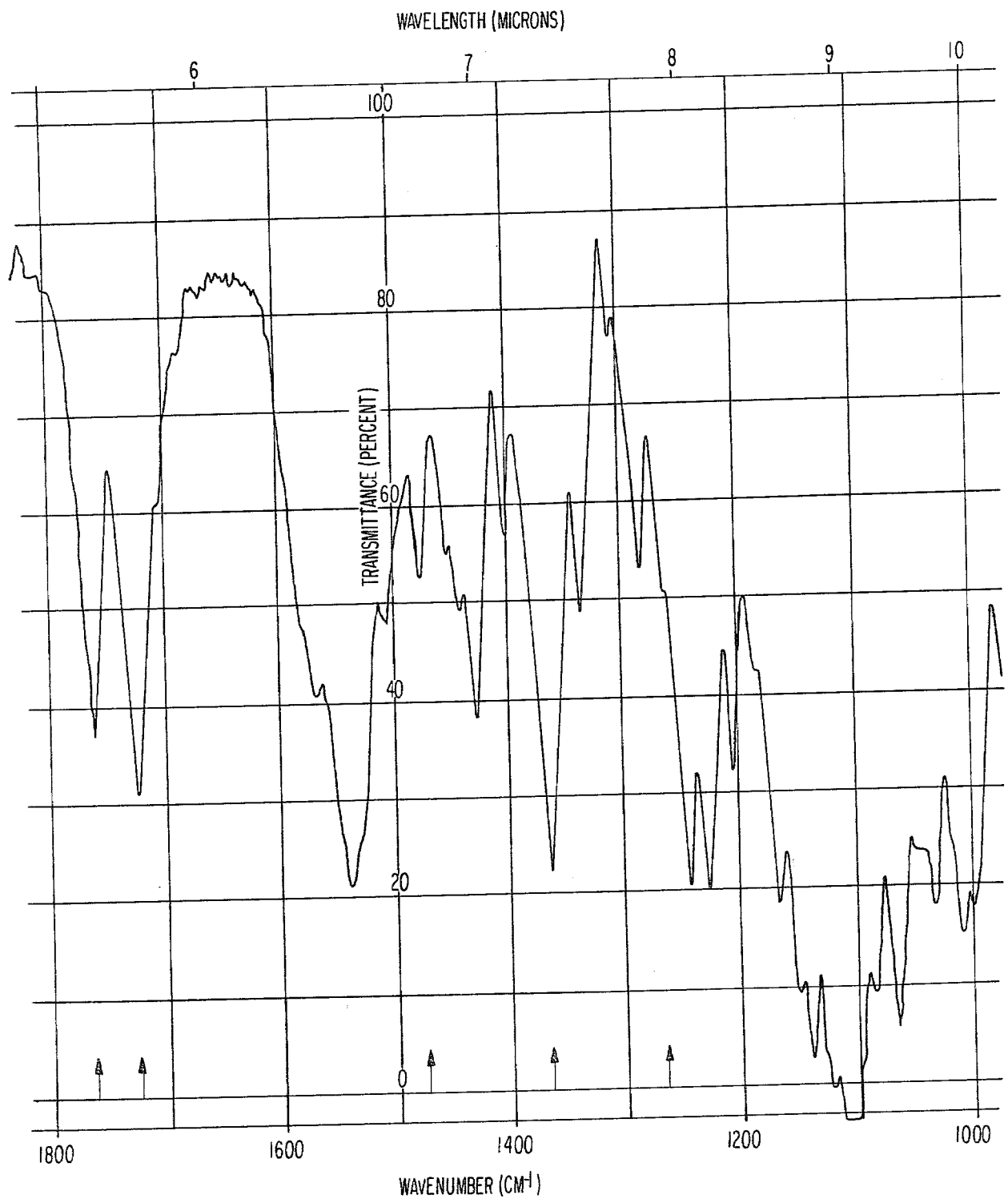
FIG. 14 is an infrared spectrum of the material with phosphatizing treatment with $MoO_3$ and polyvinyl alcohol, and with lecithin red oil treatment of the $MoO_3$ before use in the bath.

When the treated surface was immersed in water for 2 weeks it released a small amount of reaction coating into the water solution. When this released matter was taken out of the water by shaking with ethyl ether, and later an IR spectrum was taken, this release showed the presence of a lecithin band at 1770 cm$^{-1}$ which is not present when the molybdenum trioxide was used without lecithin treatment of the metal oxide. See FIGS. 13 and 14.

EXAMPLE 20

Lecithin-Modified Oxides In Interreaction With Polymeric Latices

Metal oxides can interreact with unsaturated water-dispersed polymeric materials, such as latices. But in the presence of lecithin materials the degree of such interreaction is increased considerably. This was established by the following experimental findings:

TEST A: 20 g of metal oxide (molybdenum trioxide) was ball-milled with 150 g of acrylic latex (Rhoplex Ac-235 46–47 percent solids) and 30 g of water.

Test B: 20 g of metal oxide (molybdenum trioxide) was ball-milled with 20 g of partially hydrolyzed soybean lecithin (ALCOLEC ®621) and 150 g of acrylic latex.

Test C: 20 g of metal oxide (molybdenum trioxide) was ball-milled with 20 g of industrial "red oil" (acetone-soluble fraction of crude oil-carrier soybean lecithin) and 150 g of acrylic latex.

Afterwards the solid fraction was filtered off and the watery fraction diluted to 150 ml of solution. After such solution had been made acidic (by addition of hydrochloric acid) to a pH 1.5, the metal content in each of the three solutions, A, B, and C, was determined by electrodeposition analysis (using Fisher Electro Analyzer #9-264- 100 V 1) and using an 8 Volt current for 20 minutes. By such means, plain metal deposits migrate to the platinum cathode; the products between the metal oxide and the polymer latex fractions and those in the lecithin migrate to the "stirring" electrode (or anode).

Without lecithin, (TEST A) 46.16 parts of polymer fraction (0.0214 g) was obtained as against 100 parts of straight metal deposit (0.0455 g). With partially hydrolyzed lecithin (ALCOLEC ® 621), 81 parts of polymer fraction (0.0443 g) was obtained as against 100 parts of straight metal deposit (0.0547 g). With the "red oil" (acetone-soluble fraction of the crude lecithin), 119 parts of polymer fraction (0.0537 g) was obtained as against 100 parts of straight metal deposit (0.0417 g).

The lecithin material acted to increase the formation of the interreaction products between the metal oxide and the lecithin and the latex polymers. The deposit of the straight metal deposit is a smooth deposit on the electrode; the polymer product on the anode is, in the case of the lecithin-free materials (TEST A), a white solid matter and, in the case of Tests B and C, it is blue-gray in color.

When the same test was made with the same latex, but using cadmium oxide as the metal oxide, the polymer solid deposit on the anode was very light brown (TEST A). In the presence of the partially hydrolyzed lecithin it was dark brown (TEST B) and in the case of the "red oil" it was purple colored.

EXAMPLE 21

Using A Restored Oil-Carrier Lecithin

Instead of using a crude oil-carrier lecithin, a pure (granular) industrial lecithin (which is insoluble in acetone) can be restored into an oil-carried type lecithin by heating 100 g of granular lecithin with 40 g of soybean oil for 30 minutes at 40° C. and using this restored oil-carrier type lecithin for the modification of a red lead oxide. It can also be performed under stronger heating for 90 minutes at 100° C. and can then be used with the metal oxides, such as the red lead oxide. The oily fraction varies under the treatment with red lead oxides as follows:

TABLE 14

Colorimeter Readings (Standard Used 25% ALCOLEC S ® in Hexane

| Sample Hexane Solutions | Untreated With Red Lead | After Treatment With Red Lead | Decrease in Percent |
|---|---|---|---|
| 25% (Mildly heated) | 137 | 46.5 | 65.3% |
| 12.5% | 150 | 48.7 | 67.5% |
| 6.25% | 161.4 | 60.5 | 62.5% |
| 3.12% | 168.4 | 74.0 | 56.0% |

The undissolved sedimentation of a restored-oil-carrier lecithinmodified red lead oxide (when incorporated into a paint of the same formulation as shown in Example 11) shows, after storage, a readily remixed, full remiscibility of the pigment with the vehicles. The untreated red oxide did not remix readily with the vehicle.

EXAMPLE 22

RELATION BETWEEN THE EXTENT OF THE METAL OXIDE MODIFICATION AND THE BEHAVIOR IN DISPERSIONS

Above, on page 15 of this specification, metal oxides different reactivity were shown to vary in the extent of their modification when heated with lecithin and it was shown that the resulting modifications appear in the infrared spectra. There were among the metal oxides used a red lead oxide (lead orthoplumbate) and a higher reactive lead dioxide (lead peroxide). The different degree of changing spectrum lines were pointed out.

Figure 2:
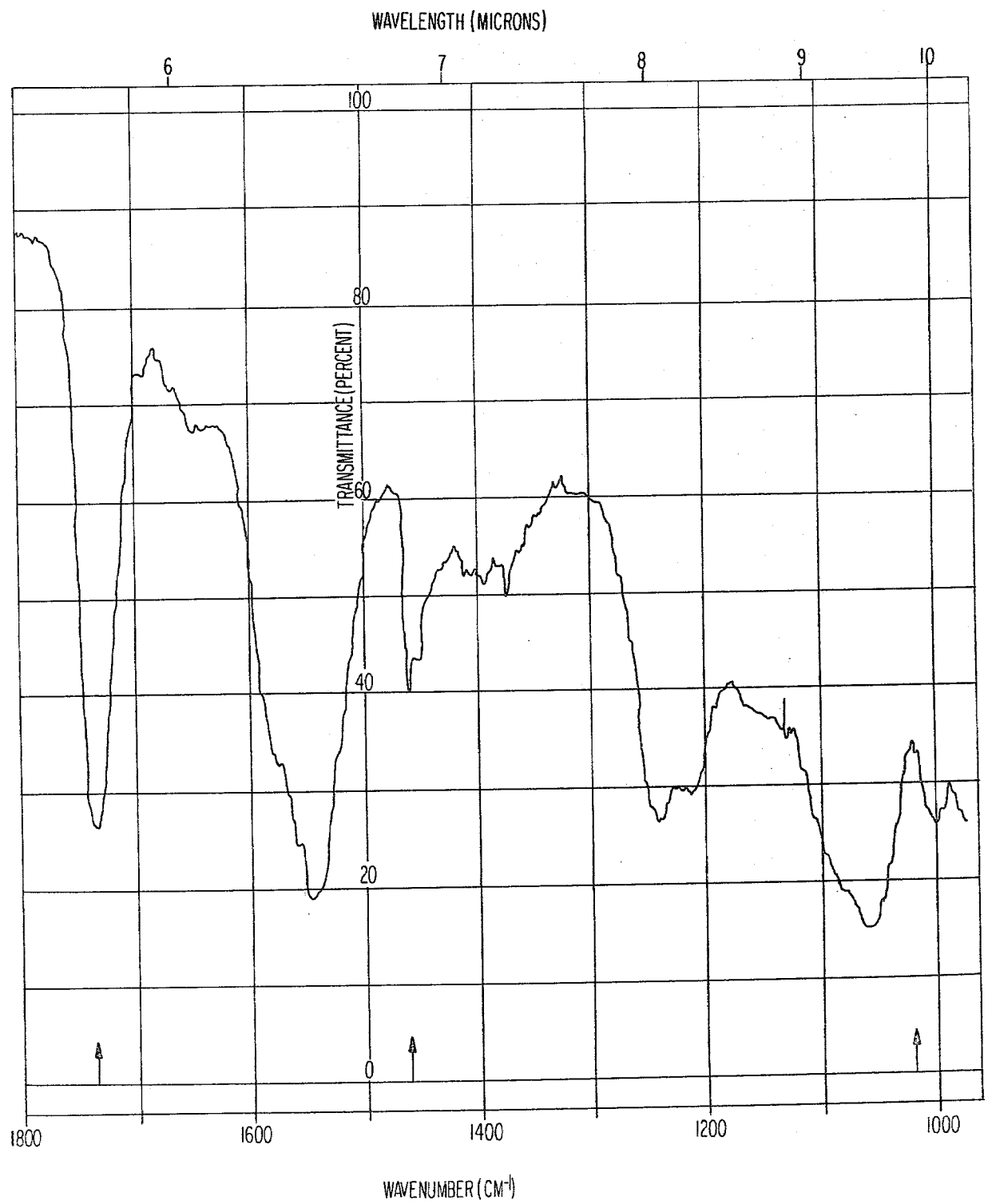
FIG. 2 is an infrared spectrum of oil-carrier lecithin reacted with red lead oxide, acetone-insoluble fraction, in $CCl_4$.
Figure 3:
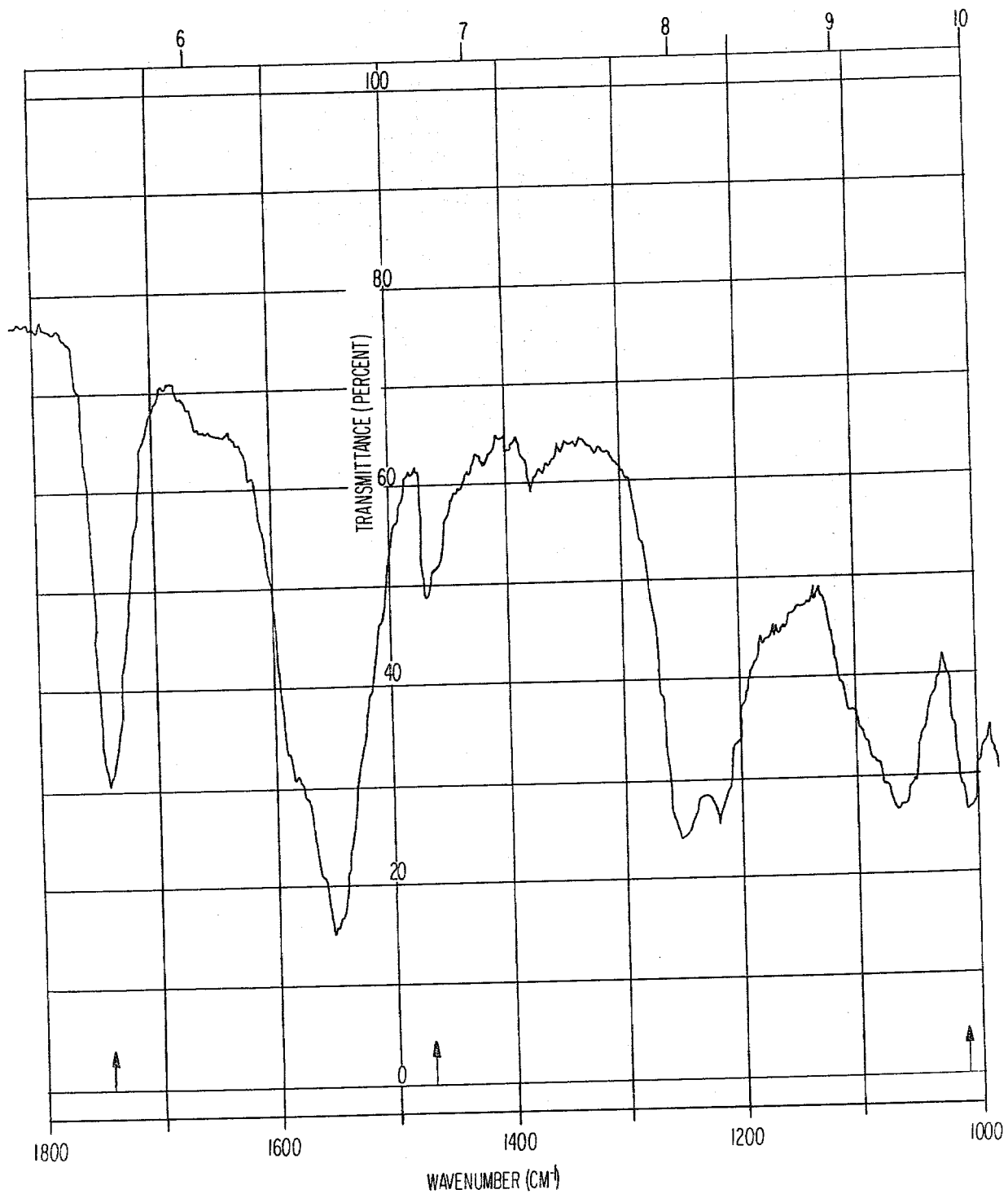
FIG. 3 is an infrared spectrum of oil-carrier lecithin reacted with molybdenum trioxide, acetone-insoluble fraction, in $CCl_4$.

The lecithin treatment of these two different lead oxides was repeated, but using, instead of oil-carrier lecithin (ALCOLEC S ®) (see FIG. 2), the acetone-soluble fraction ("Red Oil" fraction) of the oil-carrier lecithin, heating 30 g of pigment with 100 g of "Red Oil" within 30 minutes up to 140° C. and again separating the acetone-insoluble fraction.

Figure 4:
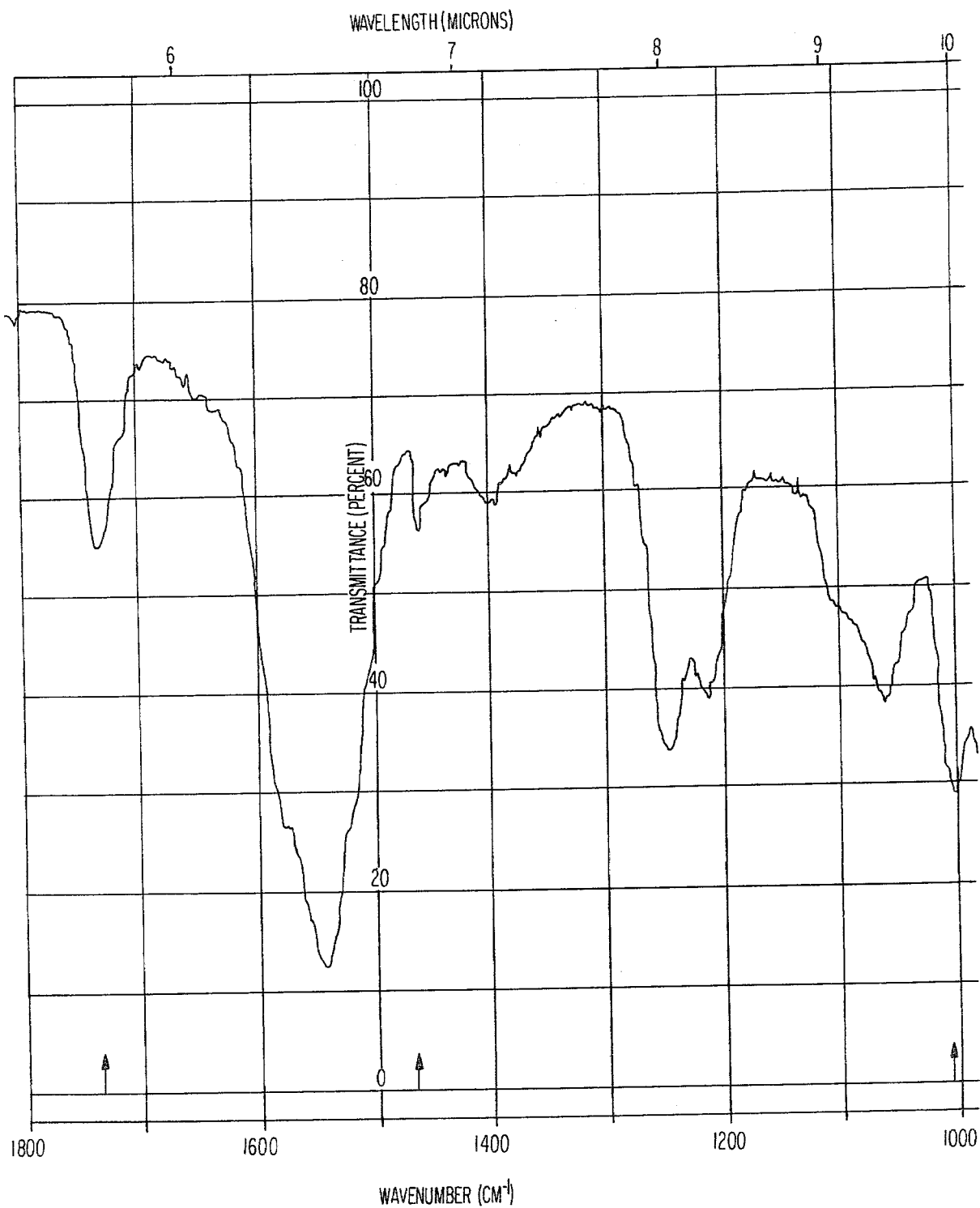
FIG. 4 is an infrared spectrum of oil-carrier lecithin reacted with lead peroxide, acetone-insoluble fraction, in $CCl_4$.
Figure 7:
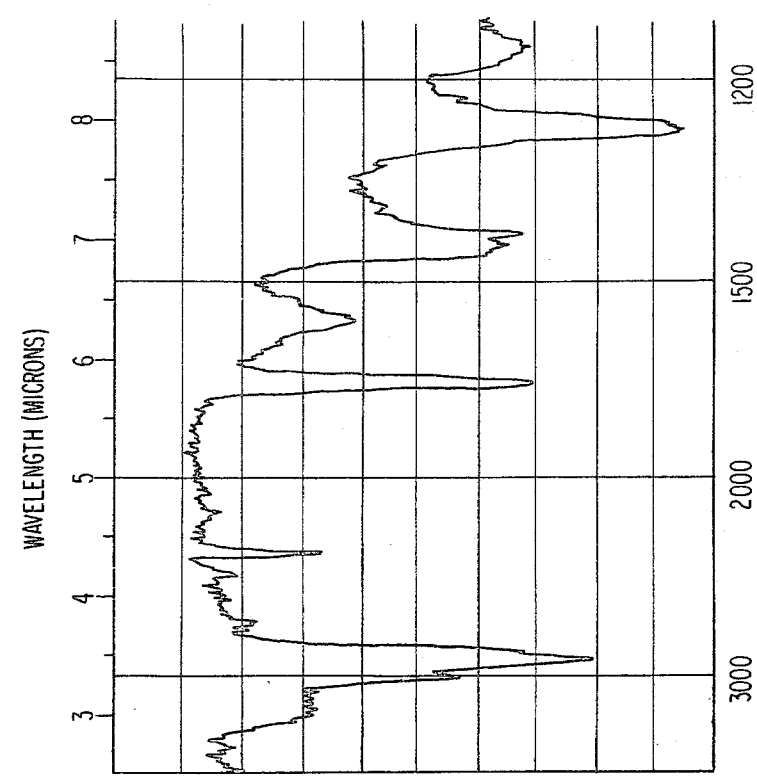
FIG. 7 is an infrared spectrum [with the infracord spectrometer (samples in methylene chloride)] of the oily acetone-soluble fraction of oil-carrier lecithin ALCOLEC S ®.
Figure 8:
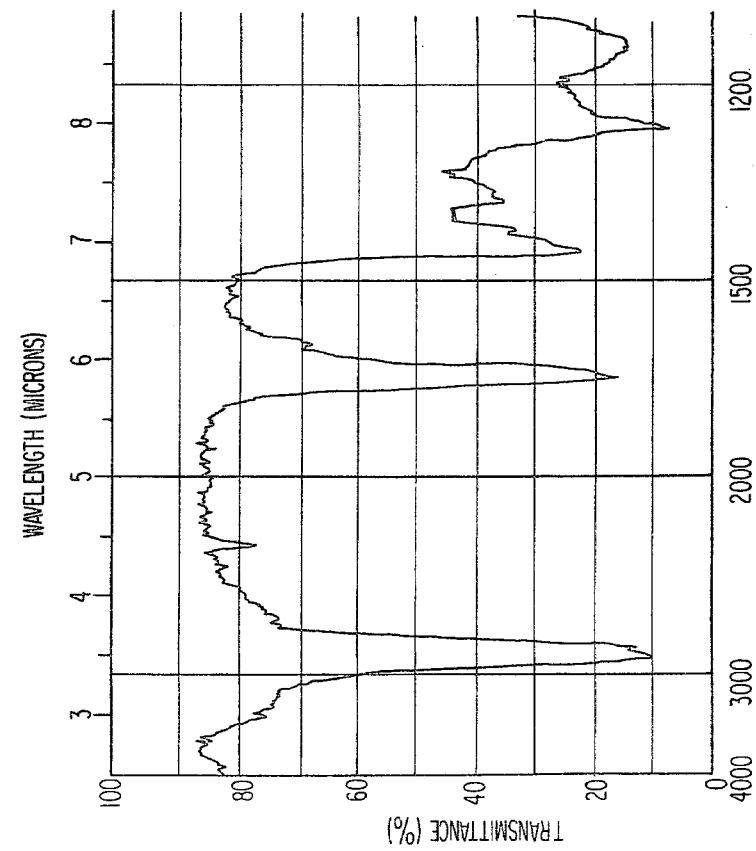
FIG. 8 is an infrared spectrum [with the infracord spectrometer (samples in methylene chloride)] of the oily acetone-soluble fraction of oil-carrier lecithin ALCOLEC S ® reacted with magnesium oxide.

In the same manner the lead peroxide was heated, instead of with the oil-carrier lecithin (see FIG. 4), with the acetone-soluble fraction of the oil-carrier lecithin. Both these isolated modified pigments were used in comparison to not-lecithin-treated red lead pigment in three test paints. These were prepared using each time:

25.0 g of pigment
12.5 g of linseed oil
4.0 g of soybean modified long oil alkyd resin ARO-PLAZ 1266 M70
5.0 g of odorless paint thinner
1.0 g of cobalt naththenate Co (6%)

The ball-milled paints were allowed to stand for two weeks. Afterwards, the paint with the red lead pigment without lecithin treatment was (upon being shaken) not restored into full redispersion. The paint with the red lead pigment which had been lecithin treated with the "Red Oil" had settled out too, but remixed readily and fully upon shaking by hand into a redispersion. The paint containing the lecithin-modified lead peroxide—which had shown the greatest modifications in the spectra—did not require any redispersion by shaking as it had not settled out.

What is claimed is:

1. Process of chemically modifying a metal oxide, which comprises treating said metal oxide under heating at a temperature between 100° and 160° C. for a time period of at least 10 minutes with a lecithin material, in fluid form, whereby said metal oxide in the form of a grouping enters the lecithin fluid or the lecithin-fluid fraction, and whereby thereafter a modified metal oxide, partially in a suspended form, is developed partially dissolved in the fluid lecithin.

2. Process as claimed in claim 1 wherein said vegetable lecithin is soybean lecithin, corn lecithin or safflower lecithin.

3. Process as claimed in claim 1 wherein said lecithin is used in the form of its oily fraction or acetone-soluble fraction, which is obtained by mixing lecithin in its crude oil carrier form with acetone, whereby an oily fraction of said crude lecithin is dissolved in the acetone and an insoluble fraction is precipitated, and separating said oily fraction or acetone-soluble fraction from said precipitated insoluble fraction.

4. Process as claimed in claim 3 wherein said fluid lecithin is used in the presence of another fluid such as triglyceride oil or a diluent.

5. Process as claimed in claim 1 wherein said lecithin is an egg lecithin.

6. Process as claimed in claim 1 wherein the metal oxide is an oxide of iron, lead, molybdenum, titanium, zinc, cadmium or copper.

7. Process as claimed in claim 1 wherein said heating is conducted for a time between 6 minutes and one hour.

8. Process as claimed in claim 1 wherein said lecithin material is a vegetable lecithin, an animal lecithin, an acetone-soluble fraction of a vegetable lecithin or an acetone-soluble fraction of an animal lecithin.

9. Process wherein the metal oxide of claim 1, which has an increased rate of water solubility, such as allowing the lecithin-modified metal oxide to enter a solution in water, are subjected, after addition of some acidity, to electrodeposition, with the present straight metal ions being deposited at the cathode of the analyzer and the reaction product between the metal groupings and the lecithin and a reactive additional polymeric component being deposited at the anode, whereby the presence of the water dissolved product can so be identified.

10. Process as in claim 1 wherein said solid modified metal oxide is separated from the modified lecithin or modified lecithin fluid fraction.

11. Metal oxide particles, which have been chemically modified by heating said metal oxide particles with a lecithin, selected from the group consisting of a plant lecithin, an animal lecithin and an acetone-soluble fraction of either, said heating having been done at a temperature effective to achieve said chemical modification, at least an extensive portion of said metal oxide particles being chemically modified by said lecithin, and which has increased redispersibility and solubility, that is useful in a solvent-based or water-based coating material.

12. Metal oxide particles, which have been chemically modified by heating said metal oxide particles with a lecithin, selected from the group consisting of a plant lecithin, an animal lecithin and an acetone-soluble fraction of either, said heating having been done at a temperature effective to achieve said chemical modification, at least an extensive portion of said metal oxide particles being chemically modified by said lecithin, and which has either increased redispersibility or solubility, that is useful in a solvent-based or a water-based coating material.

13. Metal oxide particles, which have been reacted with lecithin matter, thereby being chemically modified, in the form of a component in the oily fraction of lecithin, said reaction having been done at a temperature effective to achieve said chemical modification, at least an extensive portion of said metal oxide particles being chemically modified by said lecithin.

14. Lecithin or a lecithin fraction, which has been chemically modified by the reaction with and the entry of metal oxide particles in the form of an interreaction product between said lecithin or said lecithin fraction and said metal oxide particles, said reaction having been done at a temperature effective to achieve said chemical modification, at least an extensive portion of said metal oxide particles being chemically modified by said lecithin.

15. The chemically modified metal oxide prepared by the process of claim 1.

16. Process as claimed in claim 3 wherein said lecithin is used in the form of its acetone-insoluble fraction, which has been separated from the oily lecithin fraction, after reintroducing a selected oily matter from the group of triglyceride oils, so as to become a component of said lecithin material which is then used to treat said metal oxide.

17. Process as claimed in claim 3 wherein the solid and modified metal oxide are separated from the modified oily fraction.

18. Process of placing said modified form of metal oxide of claim 17 in a water dispersion, whereafter the dissolved matter can in solution further interract with reactive components dissolved in the same water or an additional reactive organic component in the water so further modifying in the water dispersion the metal oxide matter with the lecithin groupings.

19. Process as claimed in claim 18 wherein said additional reactive organic component is an unsaturated polymeric matter.

20. Process as claimed in claim 19 wherein said unsaturated polymeric matter is a latex.

21. Process of using the lecithin-modified metal oxide of claim 17 as a paint pigment which is, with or without the addition of additional lecithin matter, more readily after storage redispersible in the paint than the not-lecithin-modified metal oxide pigment.

22. Process as claimed in claim 21 wherein the dispersions of the lecithin-modified metal oxides are incorporated as dispersions in fluids or in solutions jointly with unsaturated polymeric materials, and wherein said modified metal oxides are after storage readily redispersible with or without requiring a separate addition of lecithin materials.

23. Process as claimed in claim 22 wherein said modified metal oxide is used in a paint composition, said metal oxide being more readily redispersible in said paint after extended storage that can be obtained when not-modified metal oxide has been used.

24. Process as claimed in claim 22 wherein the paint contains said modified metal oxide having a higher specific gravity jointly with a non-lecithin-heat-modified pigment of lower specific gravity, whereby both the pigment and the modified metal oxide are readily redispersible.

25. Process as claimed in claim 22 wherein said unsaturated polymeric materials are those used in coating materials.

26. The metal oxide as claimed in claim 11 wherein said heating is at a temperature between 100° and 160° C.

27. The metal oxide as claimed in claim 13 wherein said reaction is conducted at a temperature between 100° and 160° C.

28. The lecithin or lecithin fraction as claimed in claim 14 wherein said reaction is conducted at a temperature between 100° and 160° C.

29. The process as claimed in claim 1 wherein only said metal oxide and said lecithin material are present during said heating step.

30. The chemically modified metal oxide prepared by the process of claim 29.

31. The metal oxide as claimed in claim 26 wherein only said metal oxide and said lecithin are present during said heating step.

32. The metal oxide as claimed in claim 27 wherein only said metal oxide and said lecithin matter are present during said reaction step.

33. The lecithin or lecithin fraction as claimed in claim 28 wherein only said metal oxide and said lecithin or lecithin fraction are present during said reaction step.

* * * * *